United States Patent [19]

Fujimoto

[11] Patent Number: 5,479,183
[45] Date of Patent: Dec. 26, 1995

[54] APPARATUS AND METHOD FOR DETECTING AN OPTICAL CRT DISPLAY CONNECTED TO A COMPUTER SYSTEM

[75] Inventor: Akihisa Fujimoto, Tokyo, Japan

[73] Assignee: Kabushiki Kaisha Toshiba, Kawasaki, Japan

[21] Appl. No.: 257,701

[22] Filed: Jun. 10, 1994

Related U.S. Application Data

[63] Continuation of Ser. No. 945,510, Sep. 16, 1992, abandoned.

[30]    Foreign Application Priority Data

Sep. 17, 1991 [JP] Japan .................................. 3-236577

[51] Int. Cl.$^6$ ....................................................... G09G 5/12
[52] U.S. Cl. ................................................................ 345/3
[58] Field of Search ................................ 345/3, 132, 211, 345/212, 904

[56]         References Cited

U.S. PATENT DOCUMENTS 5,072,411  12/1991  Yamaki .
5,138,700   8/1992  Kinoshita .
5,140,693   8/1992  Ninomiya .
5,159,683  10/1992  Lvovsky et al. .

FOREIGN PATENT DOCUMENTS 61-296383  12/1986  Japan .

OTHER PUBLICATIONS

Western Digital, "WD90C26A Integrated Low Power VGA LCD Controller with Simultaneous Display", (1992), pp. 160–161.

*Primary Examiner*—Jeffery Brier
*Attorney, Agent, or Firm*—Finnegan, Henderson, Farabow, Garrett & Dunner

[57]         ABSTRACT

An optional display detecting apparatus is used in a computer system which has a flat panel display serving as a standard display unit and allows a CRT display serving as an optional display unit to be connected thereto. The apparatus includes a data replacing circuit for selecting a predetermined one of color registers in a digital-to-analog converter (DAC) and replacing color data stored in the selected color register with the test color data upon power-on of the computer system, and a voltage detector for comparing voltage levels at output terminals of the DAC with a reference level to determine whether the CRT display is connected thereto. A display controller drives a display unit selected according to comparison result from the voltage detector.

21 Claims, 6 Drawing Sheets

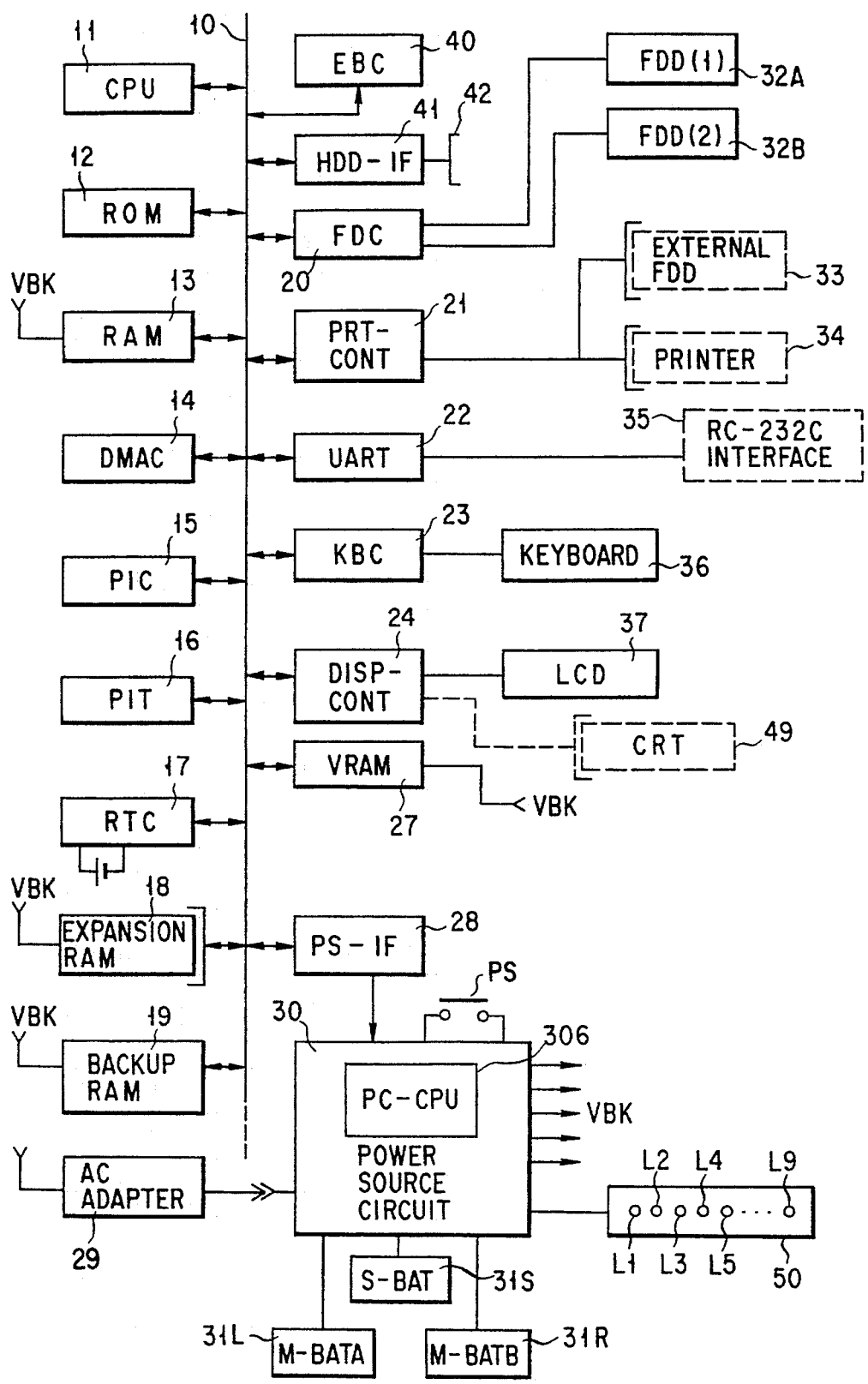
F I G. 1

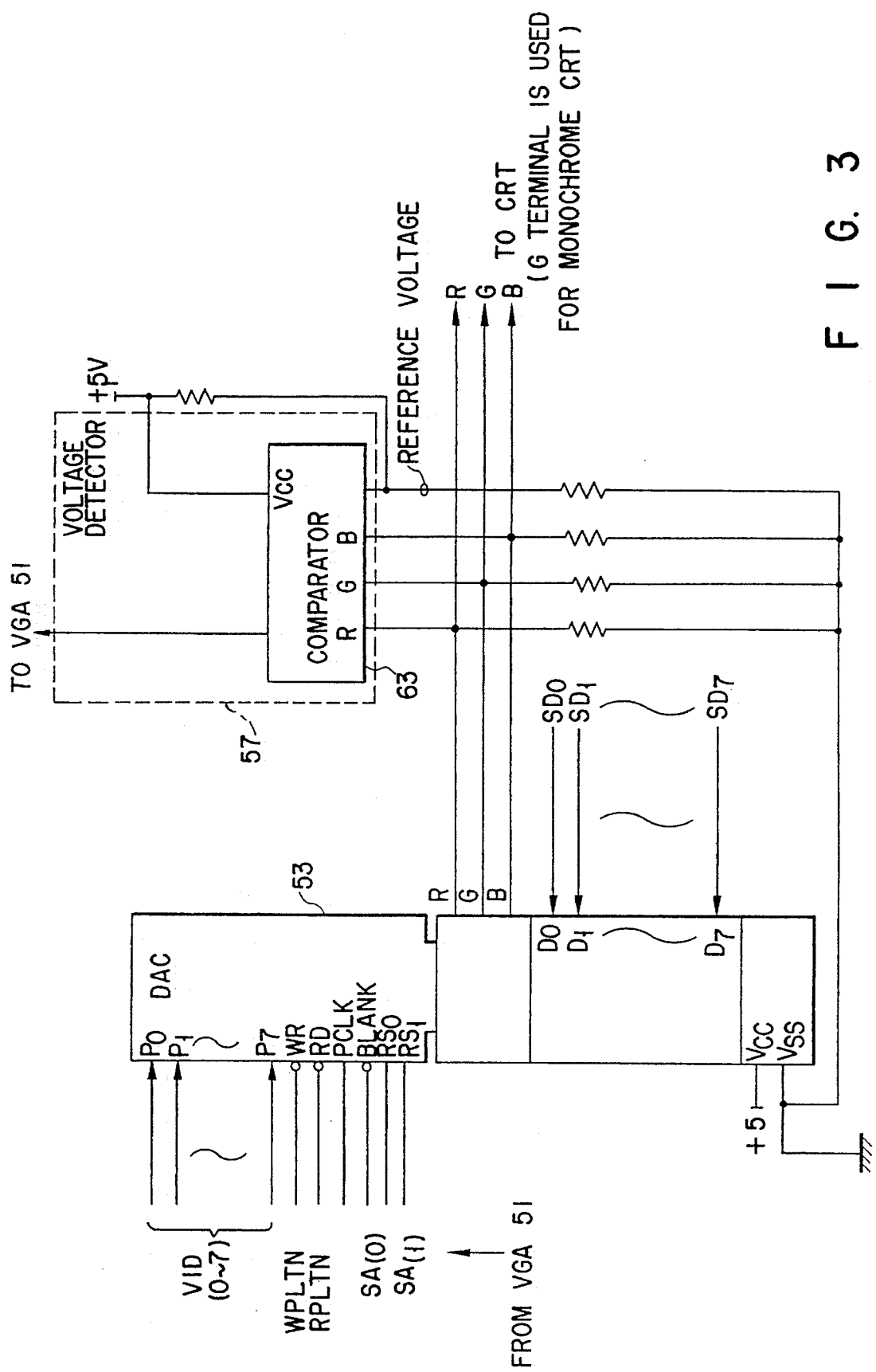
F I G. 3

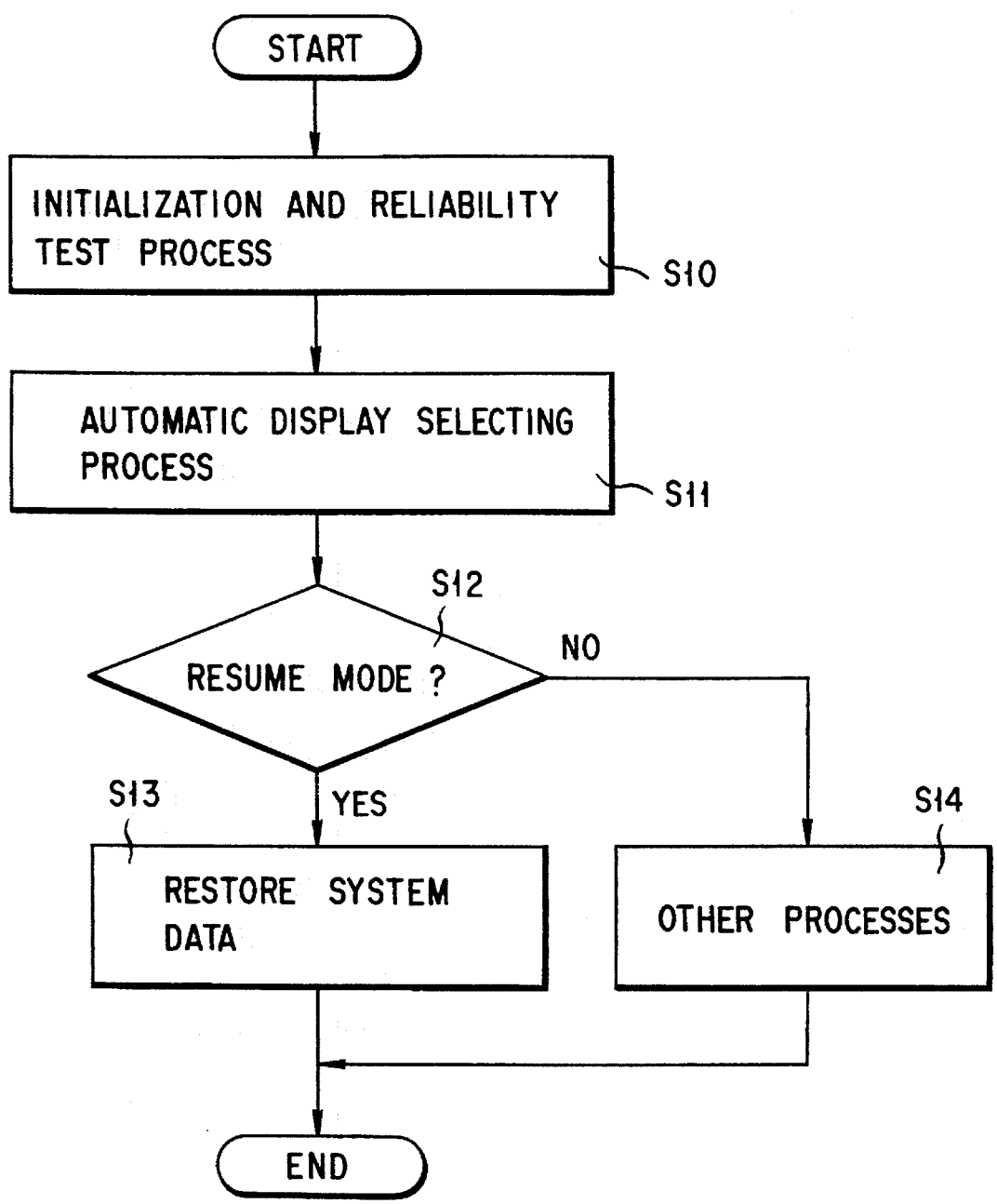
F I G. 5

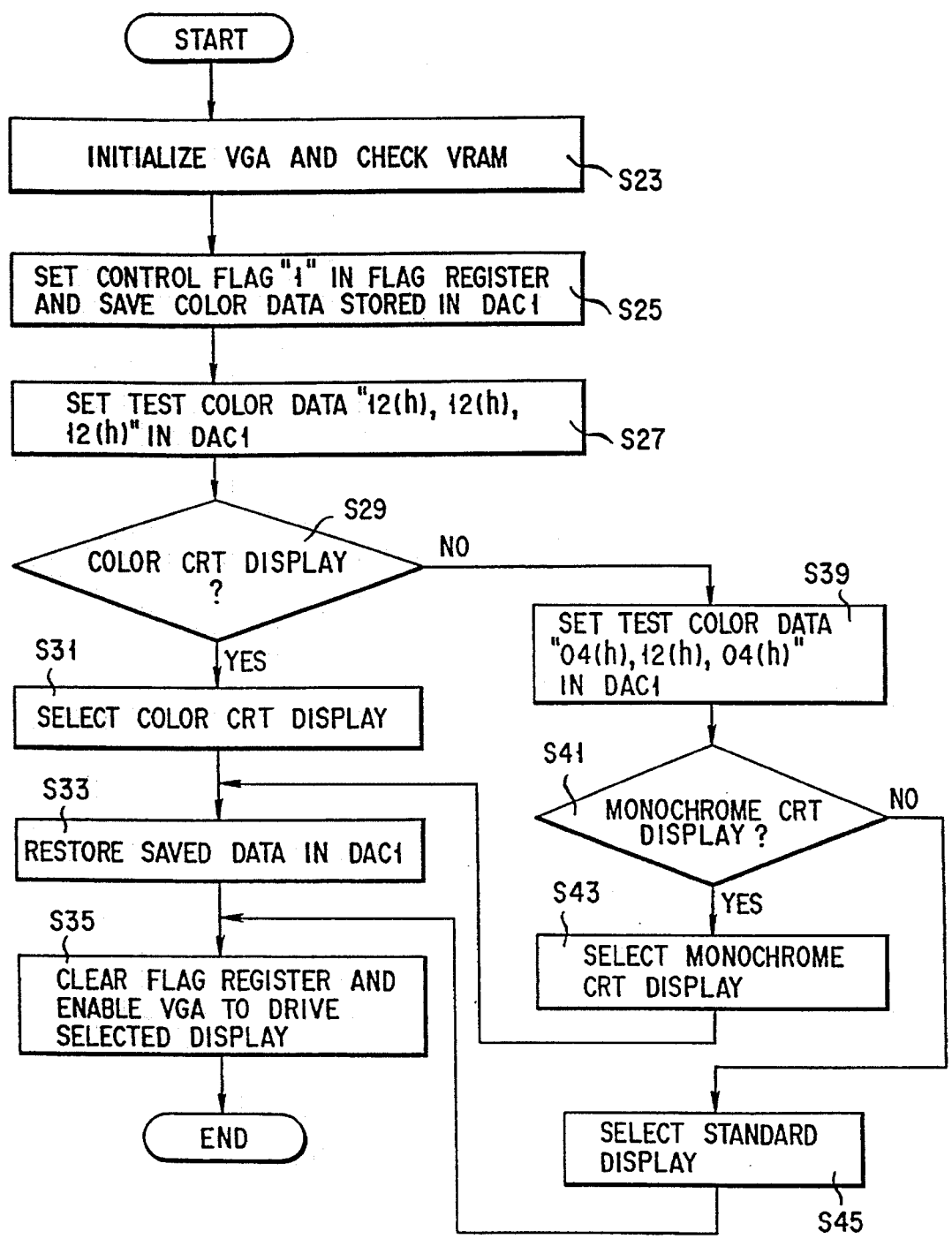
F I G. 6

5,479,183

APPARATUS AND METHOD FOR DETECTING AN OPTICAL CRT DISPLAY CONNECTED TO A COMPUTER SYSTEM

This application is a continuation of application Ser. No. 07/945,510, filed Sep. 16, 1992 now abandoned.

BACKGROUND OF THE INVENTION

1. Field of the Invention

This invention relates to an optional display detecting apparatus used in a computer system allowing selective connection of various optional displays, for sensing which optional display is now connected.

2. Description of the Related Art

In recent years, computer systems have suddenly been popularized in personal use. This tendency is largely ascribed to the existence of laptop-type or book-type computers developed as a result of remarkable progress in computer technology. Those types of computers generally incorporate a liquid-crystal display or a plasma display, featuring thinness, light weight, and low-power consumption, as a standard specification. The improvement in the computer processing capability requires higher display resolution and more display colors. Unlike CRT displays, however, the aforementioned standard display cannot easily fulfill such requirements. For this reason, some computers are designed for allowing connection of the CRT display as an optional display.

The Basic Input/Output System (BIOS) of such computers includes an initialization and reliability test routine to be executed upon start of power supply. Part of this routine is programmed to perform an automatic display selecting process. In the display selecting process, the computer checks to see if an optional display is connected thereto. The optional display is selected when the connection is detected, and the standard display is selected when no connection is detected. For example, when a video Graphic Array (VGA) adapter is used for controlling the selected display, this VGA adapter reads out image data for one frame from a video RAM, produces a series of pixel video data corresponding to the image data, and supplies the series of pixel video data to a video Digital/Analog Converter (DAC). The video DAC has a number of color registers each storing color data constituted by color values of Red, Green, and Blue. Each pixel video data from the VGA adapter selects one of the color registers in the video DAC. The video DAC converts the R, G, and B values of the color data stored in the selected color register into analog voltages, and outputs them from RGB output terminals as analog RGB signals. In the display selecting process, particular test image data are stored in the video RAM so that predetermined analog RGB signals are continuously output from the RGB output terminals. Once a CRT display is connected to the RGB output terminals, the voltage levels at the RGB output terminals vary with the load resistance inherent to the CRT display. Therefore, voltage levels at the RGB output terminals are checked to determine the connection and type of the CRT display.

Generally, the laptop-type or book-type computer supports a resume function for resuming the operation conditions of system upon start of power supply. This resume function is made active when a resume mode is set in a set-up process for the computer. In the resume mode, the system data (i.e., the instruction data, processed data, status data, and the like, stored in the internal registers of a CPU) are saved in a backup memory before cutting off of power supply, and restored from the backup memory upon restart of power supply. Since the system data is not destroyed during the suspension of power supply, execution of a program can be continued from the point of interruption after the restart of power supply.

With this type of computer, however, the automatic display selecting process is not effected when the power switch is turned on in the resume mode. Therefore, if the optional display is removed during the suspension of power supply, no data can be displayed in either optional or standard display. To avoid this problem, an attempt could be made to check again to see if the optional display is connected. This, however, would create another problem. That is, the contents of the video RAM would be destroyed by the test image data prepared for the check. Therefore, it is necessary to secure an auxiliary memory for temporarily storing image data saved from the video RAM before storing the test image data. In addition, a lot of time is required to access the auxiliary memory in saving and restoring the contents of the video RAM. To avoid this problem, an attempt could be made to store identical test color data in all the color registers of the video DAC, instead of storing image data in the video RAM. However, the contents of the color registers would be destroyed by the test color data prepared for the check. Therefore, it is necessary to secure an auxiliary memory for temporarily storing color data saved from the color registers before storing the test color data. In addition, a lot of time is required to access the auxiliary memory in saving and restoring the contents of the color registers.

SUMMARY OF THE INVENTION

An object of the present invention is to provide an optional display detecting apparatus which can check, without saving a large amount of data, to see if an optional display is connected when the power supply is started in a resume mode.

The object is attained by an optional display detecting apparatus for a computer system, which comprises a display control section, having a plurality of color registers each storing color data, for designating an address to select one of the color registers, and converting color data stored in the selected color register into analog voltages to be output from output terminals as color component signals; a data replacing section for selecting a predetermined one of the color registers, and replacing color data stored in the predetermined color register by test color data for testing display connection; and a determining section for determining whether an optional display is connected to the output terminals, on the basis of voltage levels at the output terminals obtained as a result of the conversion on the test color data set in the predetermined color register by the data replacing section.

According to the optional display detecting apparatus, presence of an optional display connected to the output terminals can be detected without saving data other than color data stored in the predetermined color register.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing the overall arrangement of a computer system according to one embodiment of the present invention;

FIG. 3 is a block diagram showing the detailed arrangement of a video DAC and a voltage detector shown in FIG. 2;

FIG. 5 is a flowchart for explaining a system reset operation performed upon start of power supply; and FIG. 6 is a flowchart for explaining an automatic display selecting process shown in FIG. 5.

DETAILED DESCRIPTION OF THE PREFERRED EMBODIMENTS

Figure 2:
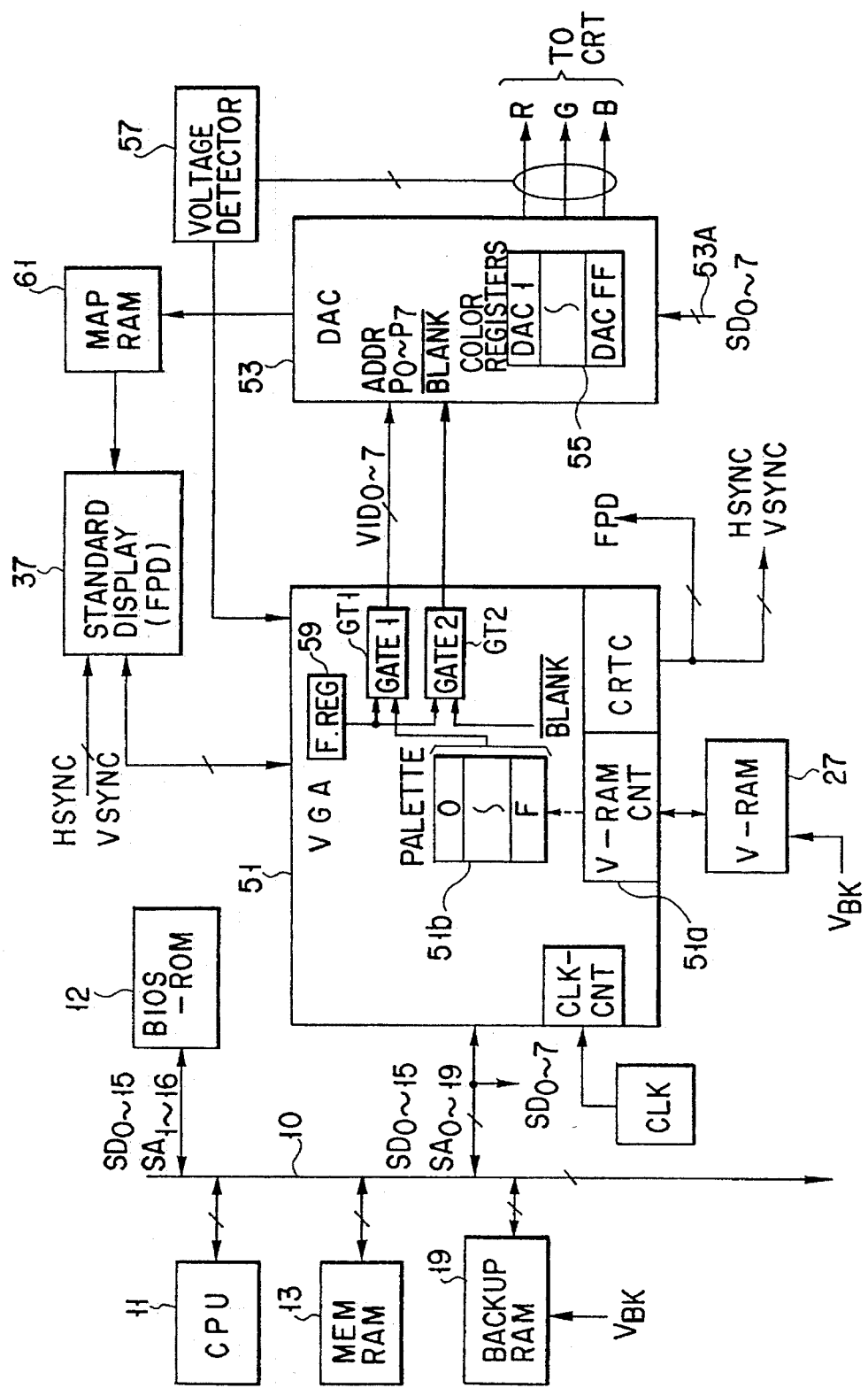
FIG. 2 is a block diagram showing the arrangement of a display controller shown in FIG. 1.

A portable computer system according to one embodiment of the present invention will now be described with reference to FIGS. 1 to 6.

FIG. 1 schematically shows the overall arrangement of the computer system. The computer system includes a system bus 10, a CPU 11, a ROM 12, a RAM 13, a direct memory access controller (DMAC) 14, a programmable interrupt controller (PIC) 15, a programmable interval timer (PIT) 16, a real-time clock (RTC) 17, an expansion RAM 18, a backup RAM 19, a floppy-disk controller (FDC) 20, a printer controller (PRT-CONT) 21, a universal asynchronous receiver/transmitter (UART) 22, a keyboard controller (KBC) 23, a display controller (DISP-CONT) 24, a video RAM (VRAM) 27, and a parallel/serial interface 28. The components 11 to 28 are interconnected by means of the system bus 10. The FDC 20 is connected to a floppy-disk drive (FDD) 32A and 32B. An external floppy-drive 33 or a printer 34 is optionally connected to the PRT-CONT 21. An RS-232C serial interface or the like is optionally connected to the UART 22. The KBC 23 is connected to a keyboard 36. The DISP-CONT 24 is connected to a liquid-crystal display (LCD) 37 serving as a standard display. A CRT display 49 is connected to the DISP-CONT 24 as an optional display. The system bus 10 is further connected to an expansion bus connector (EBC) 40 and a built-in hard-disk interface (HDD-IF) 41. An external hard-disk drive or an expansion unit is optionally connected to the EBC 40. The expansion unit can be equipped with a variety of components for functional expansion, (for example, a keyboard, a CRT display, a large-capacity memory, and a mechanism for connecting a personal computer). The HDD-IF 41 is connected via connector 42 to a built-in hard disk drive (HDD) substituted for the FDD 32B, in stepping up of the grade of the system. The PS-IF 28 is connected to a power-supply circuit 30. The power-supply circuit 30 is connected to a power switch PS, a built-in battery (S-BAT) 31S, and a status display section 50. An AC adapter 29 and rechargeable battery packs (M-BATA, M-BATB) 31L and 31R are detachably connected to the power-supply circuit 30.

The CPU 11 is provided for controlling the entire operation of the computer system. The ROM 12 stores a system control program, and other fixed data. The system control program is constituted by a Basic Input/Output System (BIOS) including at least first to third routines. The first routine is provided for performing an initialization and reliability test process, in which predetermined components are initialized and tested. The second routine is provided for performing an automatic display selecting process, in which a display is selected for use. The third routine is provided for performing a set-up process, in which setting of a resume mode, setting of a charging mode, and changing of a selected display are selectively carried out, for example. The RAM 13 serves as a main memory for storing application programs to be executed by the CPU 11 and data input to and output from the CPU 11. The DMAC 14 transfer data in units of a block by the control of the CPU 11. The PIC 15 and PIT 16 operate according to the system control program. The RTC 17 operates under the power supplied from an individual battery, and holds data representing present time and date along with data representing a type of the presently-connected display, which is determined and selected in the automatic display selecting process. The expansion RAM 18 is a memory card which is detachably connected to a dedicated card slot. The card slot can receive four different types of memory cards (i.e., 1MB, 2MB, 4MB, and 8MB memory cards). The backup RAM 19 is a memory provided for storing system data saved before the power supply is cut off in the resume mode. The FDC 20 controls both the FDDs 32A and 32B. The PRT-CONT 21 controls that one of the external FDD 33 and the printer 34 which is connected thereto. The UART 22 performs data communication via the interface unit 35, the KBC 23 inputs key-in data from the keyboard 36. The VRAM 27 stores plural frames of image data, in which a pixel is represented by four bits. The DSP-CONT 24 reads image data for one frame from the VRAM 27, and drives a selected one of the LCD 37 and CRT display 49. The AC adapter 29 rectifies and smoothes a commercial AC power source voltage, thereby converting it to a DC voltage of a predetermined level. The M-BATA 31L, M-BATB 31R, and S-BAT 31S are charged by the DC voltage from the AC adapter 29. The power-supply circuit 30 is an intelligent power supply having a power control CPU (PC-CPU) 306 which can be accessed via the PS-IF 28. Normally, the power-supply circuit 30 selects one of the rechargeable battery packs (M-BATA and M-BATB) 31L and 31R, for example, and supplies an output voltage from the M-BATA 31L, as main power, to the components of the computer system. Once this output voltage is discharged to its limit, then the battery pack is switched to the M-BATB 31R, which in turn begins to supply power. An output voltage from the S-BAT 31S serves as a backup power VBK and is supplied to the RAMs 13, 18, 19, and 27, the power-supply circuit 30, and other components. Under the backup power VBK, the RAMs 13, 18, 19, and 27 keep data stored therein unerased while the main power from the M-BATA 31L or M-BATB 31R is cut off. The status display section 50 includes LEDs L1 to L9 for displaying various items of status under the control of the PC-CPU 306.

FIGS. 2 and 3 show the arrangement of the display controller 24 more in detail. The display controller 24 is formed in a single semiconductor chip, and includes a graphic subsystem 51, a video digital/analog converter (DAC) 53, a voltage detector 57, and a mapping RAM 61. The graphic subsystem 51 is a video Graphic Array (VGA)

adapter used for controlling a selected display, based on the image data stored in the VRAM 27. The graphic subsystem 51 includes a VRAM controller 51a for accessing the VRAM 27, and sixteen palette registers 51b each storing 8-bit pixel video data. In the display control, the graphic subsystem 51 generates an internal clock signal from the external one for the CPU 11, and also generates a vertical synchronizing signal VSYNC, a horizontal synchronizing signal HSYNC, a blanking pulse signal BLANK, and other control signals with reference to the internal clock signal. Further, the graphic subsystem system 51 reads out image data for one frame from the VRAM 27, and produces a series of pixel video data VID corresponding to the image data. The series of pixel video data VID is supplied to the video DAC 53. The video DAC 53 has 256 color registers each storing color data (or tone data) constituted by color values of Red, Green, and Blue, and a direct data input/output port 53A for transferring data through the bus line 10 connected thereto. 4-bit pixel image data serves as an address data for selecting one of the 16 palette registers 51b, and 8-bit pixel video data serves as an address data for selecting one of the 256 color registers of the video DAC 53. When a color register is selected by the pixel video data from the graphic subsystem 51, the video DAC 53 converts the R, G, and B values of the color data stored in the selected color register into analog voltages, and outputs the voltages from RGB output terminals, respectively. The mapping RAM 61 stores a set of tone data preset via the video DAC 53. When the standard display is selected for use, the video DAC 53 transfers the pixel video data to the mapping RAM 61 to select one item of the tone data.

The graphic subsystem 51 further includes a flag register 59 in which a control flag "1" is set in the automatic display selecting process, and first and second gate circuits GT1 and GT2 controlled by the content of the flag register 59. When a control flag "0" is set in the flag register 59, the gate circuit GT1 supplies pixel video data obtained from a selected one of the pallet registers 51b to the video DAC 53. On the other hand, when a control flag "1" is set in the flag register 59, the gate circuit GT1 supplies dummy pixel video data to the video DAC 53. The dummy pixel video data represents the address "00(h)" of the first color register (DAC1), which is a predetermined one of the 256 color registers and stores test color data in the automatic display selecting process. The second gate circuit GT2 allows the blanking pulse signal BLANK to be supplied to the video DAC 53 when a control flag "0" is set in the flag register 59, and inhibits the supply of the blanking pulse signal BLANK when a control flag "1" is set in the flag register 59.

In the automatic display selecting process, the first gate circuit GT1 exclusively selects the first color register (DAC1), and the second gate circuit GT2 cancels the blanking pulse signal BLANK. Therefore, the video DAC 53 repeats digital-to-analog conversion on the test color data stored in the first color register (DAC1), and outputs analog RGB signals whose voltage levels are kept constant. Test color data "Red=12(h), Green=12(h), Blue=12(h)" is used to sense the presence of a color CRT display connected to the RGB output terminals, and test color data "Red=04(h), Green=12(h), Blue=04(h)" is used to sense the presence of a monochrome CRT display connected to the RGB output terminals.

Figure 4:
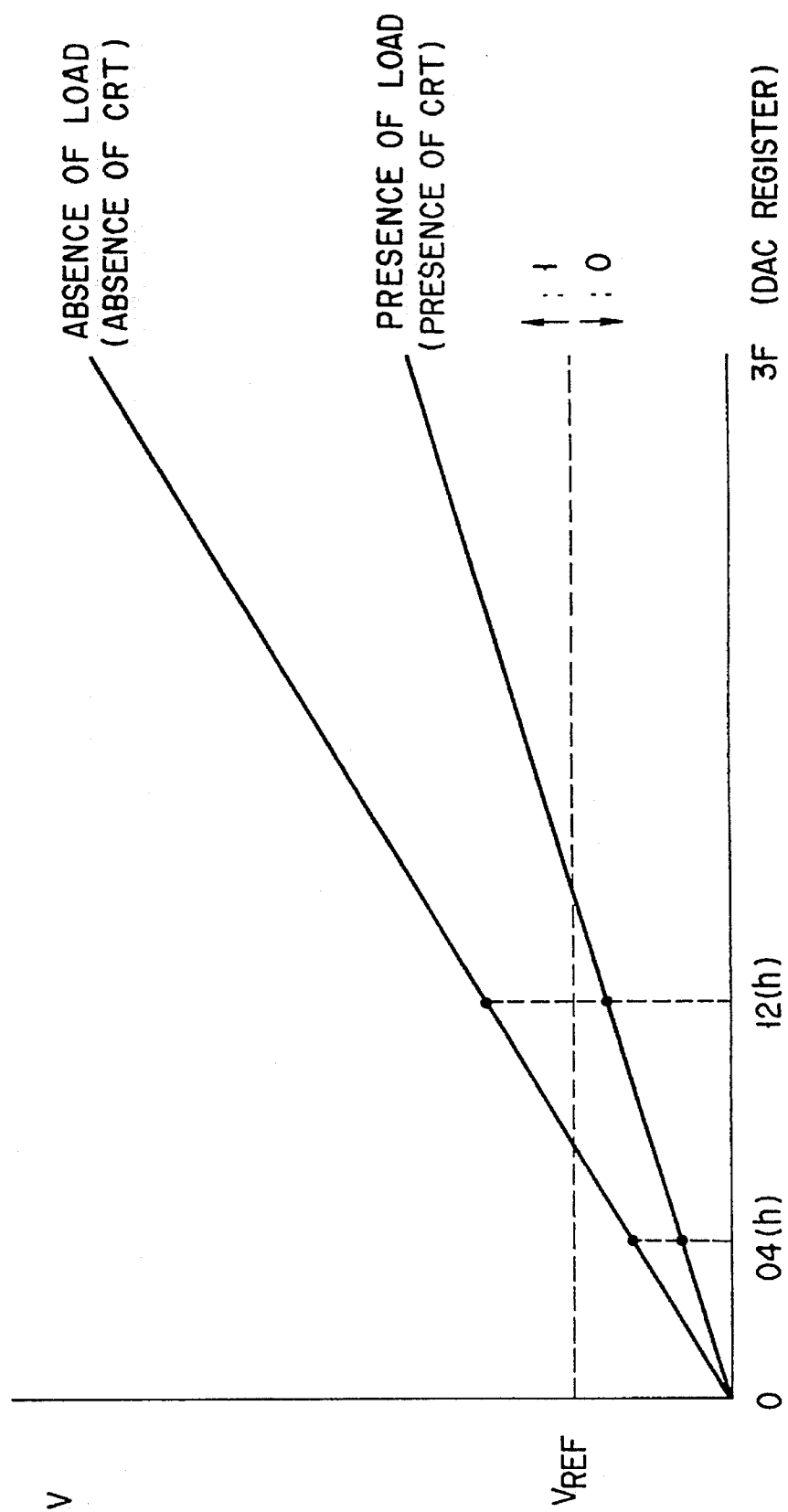
FIG. 4 is a graph showing difference in the two voltage levels at each of RGB output terminals, one obtained according to the corresponding color value of test color data stored in a color register when a CRT display is connected, and the other obtained according to the same color value when no CRT display is connected.

FIG. 4 shows difference in the two voltage levels at each of the RGB output terminals, one obtained according to the corresponding color value of the test color data stored in a color register when a CRT display is connected, the other obtained according to the same color value when no CRT display is connected. Once a color or monochrome CRT display is connected to the RGB output terminals, the voltage levels at the RGB output terminals vary with the load resistance inherent to the CRT display. Therefore, the voltage detector 57 has a comparator 63 which compares voltage levels at the RGB output terminals with a reference level, and supplies a comparison result to the graphic subsystem 51. This comparison result is held by the graphic subsystem 51, and checked by the CPU 11 to determine the connection and type of the CRT display.

Of the test color data, each color value "12(h)" is such that the voltage level at a corresponding output terminal is higher than the reference level when no CRT display is connected, and lower than the reference level when a CRT display is connected. Further, each color value "04(h)" is such that the voltage level at a corresponding output terminal is lower than the reference level when a monochrome CRT display is connected. (The monochrome CRT display is connected to the Green output terminal. Thus, the Red and Blue output terminals are not used in the connection of this display.) The Connection of a color CRT display is detected when voltages lower than the reference level are obtained at the RGB output terminals according to the first test color data "12(h), 12(h), (12(h)". The connection of a monochrome CRT display is detected when voltages lower than the reference level are obtained at the RGB output terminals according to the second test color data "04(h), 12(h), 04(h)". When any of the voltages at the RGB terminals obtained according to the first test color data and any of the voltages at the RGB output terminals obtained according to the second color data are higher than the reference level, it is determined that no CRT display is connected.

The operation of the computer system will be described with reference to FIGS. 5 and 6.

When the power switch PS is turned on, the power-supply circuit 30 begins to supply the main power. Under the main power, the CPU 11 effects a system reset operation shown in FIG. 5. In this operation, an initialization and reliability test process is performed in step S10, and an automatic display selecting process is performed in step S11. The CPU checks in step S12 whether a resume mode is set. When the resume mode is detected to be set, the system data saved in the backup RAM 19 is restored in step S13 to resume the execution of a program from the point of interruption. If the resume mode is not set, other processes are performed in step S14.

The automatic display selecting process is performed as shown in FIG. 6. When this process is started, the CPU 11 performs, in step S23, initialization of the graphic subsystem 51 and checking of the status of the VRAM 27. Thereafter, in step S25, the CPU 11 sets a control flag "1" in the flag register 59 of the graphic subsystem 51, and saves color data stored in the first color register (DAC1) of the video DAC 53 to RAM 13. In step S27, the first test color data "12(h), 12(h), 12(h)" is set in the first color register (DAC1) of the video DAC 53. The CPU 11 checks in step S29 a comparison result supplied to the graphic subsystem 51 from the voltage detector 57. When it is detected that a color CRT display is connected, the color CRT display is selected for use in step S31, and the color data saved in the RAM 13 is restored in the first color register (DAC1) of the video DAC 53 in step S33. In step S35, the CPU 11 clears the flag register 59, and enables the graphic subsystem 51 to drive the selected CRT display. In this way, the automatic display selecting process is completed.

If it is detected in step S29 that a color CRT display is not connected, the second test color data "04(h), 12(h), 04(h)" is set in the first color register (DAC1) of the video DAC 53 in step S39. The CPU 11 checks in step S41 a comparison result supplied to the graphic subsystem 51 from the voltage detector 57. When it is detected that a monochrome CRT display is connected, the monochrome CRT display is selected for use in step S43. Thereafter, the step S33 is executed.

If it is detected in step S41 that a monochrome CRT is not connected, the standard display (i.e., LCD 37) is selected for use, and a set of default tone data is stored in the mapping RAM 61, in step S45. Thereafter, the step S33 is executed.

According to the computer system described above, the automatic display selecting process is performed upon start of main power supply, even if a resume mode has been set. In this process, only the first color register of the video DAC 53 is used to store test color data, and the content thereof is saved before the test data is stored therein. Since it is not necessary to save all the contents of the color registers or the VRAM 27, the storage capacity of the auxiliary memory for temporarily storing saved data, and the time for saving and restoring data can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optional display detecting apparatus for use in a computer system which has a flat panel display serving as a standard display unit and allows a CRT display serving as an optional display unit to be connected thereto, comprising:

display control means, having a plurality of color registers each storing color data, for designating an address to select one of the color registers, and converting color data stored in the selected color register into analog voltages to be output from output terminals as color component signals;

data replacing means for selecting a predetermined one of said color registers, and replacing color data stored in the selected color register with test color data for testing optional display unit connection; and determining means for determining whether the optional display unit is connected to the output terminals obtained as a result of the conversion on the test color data set in the selected color register by said data replacing means.

2. An optional display detecting apparatus according to claim 1, wherein said data replacing means includes register selecting means for selecting said selected color register upon start of power supply, and data transfer means for saving color data from and setting the test color data in said predetermined color register selected by said register selecting means.

3. An optional display detecting apparatus according to claim 2, wherein said data transfer means includes means for setting items of test color data in said selected color register, each of the test color data items being constituted by color values of red, green, and blue, and said color values being varied with a type of said optional display unit which can selectively be connected to said output terminals.

4. An optional display detecting apparatus according to claim 2, wherein said register selecting means includes flag register means for storing a control flag, and first gate means for supplying dummy pixel video data to select said predetermined color register when the control flag is set in said flag register means.

5. An optional display detecting apparatus according to claim 4, wherein said register selecting means further includes second gate means for canceling blanking signals when the control flag is set in said flag register means, said blanking signal being generated in said display control means during the blanking of display.

6. An optional display detecting apparatus according to claim 1, wherein said determining means includes comparing means for comparing the voltage levels at the output terminals with a reference level to confirm that each of the voltage levels is lower than said reference level due to a load resistance inherent to the optional display unit connected to the output terminals.

7. An optional display detecting apparatus according to claim 6, further comprising control means for responding to power supplied to the computer system, said control means including:

means for checking whether a resume mode is set in which a process of saving system data indicating operation conditions of the system is performed in response to a power-off signal to the computer system; and means for performing a process for restoring the system data when the resume mode is detected at power-on.

8. An optional display detecting apparatus according to claim 5, wherein the display control means includes palette registers for storing pixel video data to select one of the color registers, the first gate means includes means for supplying pixel video data output from a selected one of the palette registers to the converting means in the display control means, and the second gate means includes means for allowing the blanking signal to be supplied to the converting means in the display control means when the control flag is not set in said flag register means.

9. An optional display detecting apparatus according to claim 6, wherein the optional display unit is a color CRT display.

10. A display controller for use in a computer system, comprising:

video data generating means for generating a series of pixel video data along with at least synchronizing signals;

digital/analog converting means, having a plurality of color registers each storing color data and output terminals to which an optional display is selectively connected, for converting color data stored in a color register corresponding to the pixel video data into analog voltages to be output from the output terminals as color component signals;

register selecting means for selecting a predetermined one of said color registers;

means for saving color data from and setting test color data for testing display connection in the predetermined color register selected by said register selecting means; and determining means for determining whether an optional display is connected to the output terminals, on the basis of voltage levels at the output terminals obtained as a result of the conversion on the test color data set in the predetermined color register selected by said register selecting means.

11. A display controller according to claim 10, wherein said register selecting means includes flag register means for storing a control flag, and gate means for supplying dummy pixel video data to select the predetermined color register when the control flag is set in said flag register means.

12. A display controller according to claim 11, wherein said register selecting means further includes gate means for canceling blanking signals when the control flag is set in said flag register means, said blanking signal being generated in said video data generating means during the blanking of display.

13. A display controller according to claim 10, wherein said video data generating means, said digital/analog converting means, said register selecting means, said saving and setting means, and said determining means are formed in a single semiconductor chip.

14. A display controller according to claim 10 wherein said determining means includes comparing means for comparing the voltage levels at the output terminals with a reference level to confirm that each of the voltage levels is lower than said reference level due to a load resistance inherent to the optional display connected to the output terminals.

15. A display controller according to claim 14, further comprising control means for responding to power supplied to the computer system, said control means including:

means for checking whether a resume mode is set in which a process of saving system data indicating operation conditions of the system is performed in response to a power-off signal to the computer system; and means for performing a process for restoring the system data when the resume mode is detected at power-on.

16. An optional display detecting method for use in a computer system which selectively converts color data stored in a plurality of color registers into analog voltages to be output from output terminals as color component signals, comprising steps of:

selecting a predetermined one of said color registers;

replacing color data stored in the predetermined color register selected in said selecting step with test color data for testing display connection; and determining whether an optional display is connected to the output terminals, on the basis of voltage levels at the output terminals obtained as a result of the conversion of the test color data stored in the predetermined color register selected in said selecting step, wherein said selecting step includes a step of selecting said predetermined color register upon start of power supply to said computer system, and said replacing step includes a step of saving color data from said predetermined color register selected in said selecting step and a step of setting test color data in said predetermined color register selected in said selecting step after said saving step.

17. An optional display detecting method according to claim 16, wherein said setting step includes a step of selectively setting items of test color data in said selected color register, each of the test color data items being constituted by color values of red, green, and blue, and said color values being varied with types of optional displays which can selectively be connected to said output terminals.

18. An optional display detecting method according to claim 17, wherein said selecting step includes a step of supplying dummy pixel video data to select said selected color register.

19. An optional display detecting method according to claim 18, wherein said setting step further includes a step of canceling blanking signals, each of which is generated in said computer system during the blanking of display.

20. An optional display detecting method according to claim 19, wherein said determining step includes a step of comparing the voltage levels at the output terminals with a reference level to confirm that each of the voltage levels is lower than said reference level due to a load resistance inherent to the optional display connected to the output terminals.

21. An optional display detecting method according to claim 20, further comprising a control step of responding to power supplied to the computer system, said control step including steps of:

checking whether a resume mode is set in which a process of saving system data indicating operation conditions of the system is performed in response to a power-off signal to the computer system; and performing a process for restoring the system data when the resume mode is detected at power-on.

* * * * *